April 12, 1966 A. POLLAK 3,246,248

CIRCUIT FOR SYNCHRONIZING A TV OSCILLATOR

Filed June 11, 1962 3 Sheets-Sheet 1

Inventor:
ALFRED POLLAK
BY: George M. Spencer
ATTORNEY

Inventor:
ALFRED POLLAK
BY: George H. Spencer
ATTORNEY

April 12, 1966 A. POLLAK 3,246,248

CIRCUIT FOR SYNCHRONIZING A TV OSCILLATOR

Filed June 11, 1962 3 Sheets-Sheet 3

Inventor:
ALFRED POLLAK
BY: George H. Spencer
ATTORNEY

United States Patent Office 3,246,248
Patented Apr. 12, 1966

3,246,248

CIRCUIT FOR SYNCHRONIZING A TV OSCILLATOR

Alfred Pollak, Hannover, Germany, assignor to Telefunken Patentverwertungs-G.m.b.H., Ulm (Danube), Germany Filed June 11, 1962, Ser. No. 201,590
Claims priority, application Germany, June 9, 1961, T 20,276; Sept. 22, 1961, T 20,810, T 20,812
3 Claims. (Cl. 328—74)

The present invention relates generally to synchronizing circuits, and, more particularly, to a circuit arrangement for synchronizing an oscillator with synchronizing pulses by using a phase comparison circuit, preferably a phase comparison circuit which delivers a control voltage even when there are variations in frequency.

It is known to use a phase comparison circuit with two rectifiers arranged in the same direction for synchronizing an oscillator. For this purpose, pulses of the same amplitude and opposite polarity are fed to these rectifiers via a symmetrical transformer or a phase inverter stage. An oscillation comparison or reference pulse produced in the receiver is used for comparison with the pulses fed via the transformer of the discriminator. Such oscillation comparison pulse is mostly created by differentiation of the flyback or return sweep pulses available in the line deflection transformer. A D.C. voltage is derived from the output terminals of the two rectifiers, which are arranged in push-pull fashion, and is applied as a control voltage to a reactance tube controlling the frequency of the oscillator.

It is also known to differentiate the synchronizing pulses which are received and separated from the television signal and to feed the thus differentiated oscillation comparison or reference pulse, which has a control flank, to the connecting point between two rectifiers arranged in the same direction and thus to the adjacent electrodes of these tubes. These rectifiers pertain to a phase comparison circuit. The other electrodes of these rectifiers are fed locally produced pulses of the opposite polarity. The D.C. control voltage obtained by these two rectifiers is applied to the reactance tube of the oscillator.

By more or less intensively filtering the control voltage derived from the rectifiers, the synchronization is rendered free of disturbances. However, because of such an intense filtering which is desirable, the pull-in range of the synchronizing circuit is diminished, so that even with small frequency variations of the locally produced pulses from the frequency of the received pulses a loss of synchronization is caused. To avoid this drawback, many proposals have already been offered. For example, an automatically operating switch [diode] is often used, which, when synchronization is lost, increases the pull-in range to such an extent that synchronism is obtained between the received and the locally produced pulses.

A circuit has also become known (Radio Mentor 1960, page 956) in which switching of the pull-in range is omitted by employing an additional, relatively large storage condenser. This circuit arrangement uses a voltage which is produced when synchronization is lost at the instant when the two trains of pulses occur together. This voltage surge quickly charges the coupling condensers to the diodes, as will be explained in greater detail below. These coupling condensers discharge via one or more resistors to a large storage condenser whose voltage is used as control voltage.

This known circuit would fulfill the expectations of good operability if the comparison pulse were completely symmetrical. However, this does not occur because the comparison pulse was created by differentiating a pulse which approximated a rectangular pulse. This results in the disadvantage that the circuit constructed in this manner delivers a control voltage having an asymmetrical curve whereby, depending upon the direction of the frequency variation, a larger or smaller frequency range is pulled-in. In the known circuit, an attempt is made to avoid or diminish this asymmetry by controlling the tube which is regulated by the asymmetrical control voltage in the positive control direction with respect to the grid current field, and by additionally shifting the point of equilibrium on the control voltage characteristic in the negative direction so that when synchronism is present, a negative control voltage exists. However, this has the disadvantage that when the pulses are missing, the biasing voltage of the tube is missing, too, and this causes a detuning. Besides, the entire circuit is more susceptible to disturbances because of this asymmetry.

With these defects of the prior art in mind, it is a main object of the present invention to provide a circuit arrangement which provides a control voltage which is symmetrical.

Another object is to provide a circuit of the type described in which the same frequency range is always effective.

A further object is to provide a circuit in which the need for special components to shift the balance point of the control voltage is unnecessary.

The present invention provides half pulses of the comparison pulses which control the rectifiers of the phase comparison circuit in the conductive direction so as to have such a different amplitude that the curve path or characteristic of the control voltage delivered by the phase comparison circuit in dependence on the frequency is zero symmetrical with respect to the control voltage occurring in the case of synchronism. Thereby, the pull-in ranges on both sides of the synchronism are again the same size.

Additional objects and advantages of the present invention will become apparent upon consideration of the following description when taken in conjunction with the accompanying drawings in which.

Figure 1:
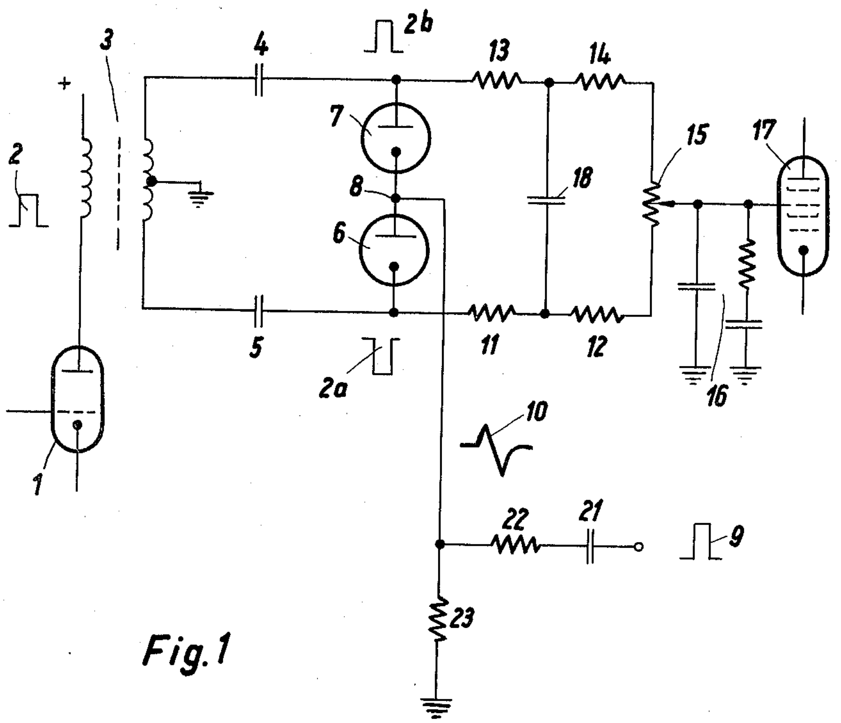
FIGURE 1 is a circuit diagram of a known phase comparison circuit.

In FIGURE 1, the synchronizing signal 2 is separated from the video signal by means of a separating circuit such as a clipper or synchronizing separator of which only the last tube 1 is shown. The synchronizing signal 2 is then fed via the transformer 3 and two condensers 5 and 4 with opposite polarity to the cathode of a diode 6 and to the anode of a diode 7, respectively. A series of oscillation comparison pulses are fed to the connection point 8 between these diodes. This train of pulses is obtained by means of a differentiating section 21, 22, 23 from a locally produced pulse train 9. The cathode of the diode 6 is connected to the anode of the diode 7 via resistors 11, 12, 13, 14 and 15. Resistor 15 is constructed as a potentiometer. The control voltage may be derived from the tap of this potentiometer and applied to the control grid of a reactance tube 17 via a filter 16. The connection points of resistors 13 and 14, and of resistors 11 and 12 are connected together via a condenser 18 of relatively large capacity.

Figure 2:
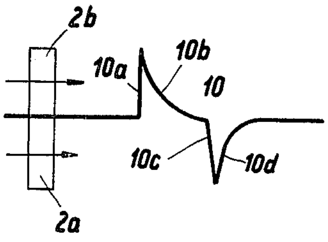
FIGURES 2 and 3 are wave diagrams indicating the operation of the embodiments of the present invention.

In the circuit described thus far, the condensers 4 and 5 are quickly charged via the diodes 6 and 7 when, with synchronism being lost, i.e., at that moment, synchronizing pulses 2*a* and/or 2*b* encounter the comparison pulse 10, as illustrated in FIGURE 2. The discharge of these condensers takes place via the resistors 11 and 13 mainly to the storage condenser 18 which retains the corresponding voltage, and partially to the resistors 12, 14, 15. The direction of propagation of the pulses 2*a* and/or 2*b* relative to the comparison pulse 10 is determined by the direction of the frequency variation between the two pulse trains so that depending upon the direction of the frequency variation the pulse 2*b* runs from the left—as shown in FIGURE 2—or from the right toward the pulse 10. When it is as illustrated in FIGURE 2, the positive pulse 2*b* first meets flank 10*a*, whereby the condenser 4 is charged. When moving across the lower portion 10*c* of the comparison flank 10*b*, 10*c*, the negative pulse 2*a* charges the condenser 5 to an opposite potential. Thus, the condensers 4 and 5 are charged with opposite voltages one after the other, and these charges or voltage surges are then transferred to the condenser 18.

The influence of the charge of condenser 5 is predominant because the charge stemming from condenser 4 has already been partially lost [via resistors 14, 15, 12]. Thus, a control voltage appears at the condenser 18 so that the frequency of the oscillator which includes the reactance tube 17 is additionally controlled in the direction of the frequency of the received pulses.

If pulses 2*a* and 2*b* in FIGURE 2 move in the opposite direction, the condenser 5 is charged when the flank 10*d* is passed, and then, when the flank 10*b* is passed, the condenser 4 is charged to an opposite potential. As a result, a control voltage is present at the condenser 18 which is in this opposite voltage direction. However, this control voltage is larger than the control voltage with the first assumed propagation direction, because the flank 10*b*, which is responsible for the extent to which the condenser 4 is charged, is not as steep as the flank 10*c* which governs the charge of the condenser 5, and thus the charging time is correspondingly longer, and complete charging is not achieved. Because of this, the pull-in ranges on both sides of the zero point of the control voltage curve of the phase comparison circuit [control voltage zero] are of different size. Thus, asymmetry of the produced control voltage arises due to the difference in steepness of the portions 10*b* and 10*c* of the comparison flank.

Figure 3:
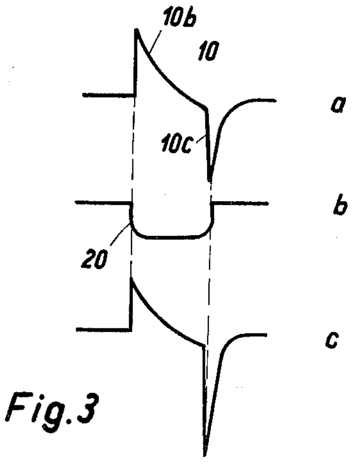

The present invention avoids this disadvantage by providing a unidirectional pulse 20, that is a pulse directed in one direction only, as shown in FIGURE 3*b* which is superimposed on the pulse 10 shown in FIGURE 3*a*. This pulse 20 has such polarity that, as illustrated in FIGURE 3*c*, the amplitude of the negative half pulse, i.e., the half pulse corresponding to the back flank of the original pulse 9 is greater than that of the other half pulse. Thus, the control voltage curve, i.e., the curve of the control voltage fed to the tube 17, with respect to frequency, becomes symmetrical. Regulation of the balance point of the phase comparison circuit at a different point from the zero point, as was necessary in the circuit according to FIGURE 1 and provided by potentiometer 15, is unnecessary. For balancing the receiver oscillator, a control voltage of 0 volts is considered to be the most advantageous operating point.

Figure 4:
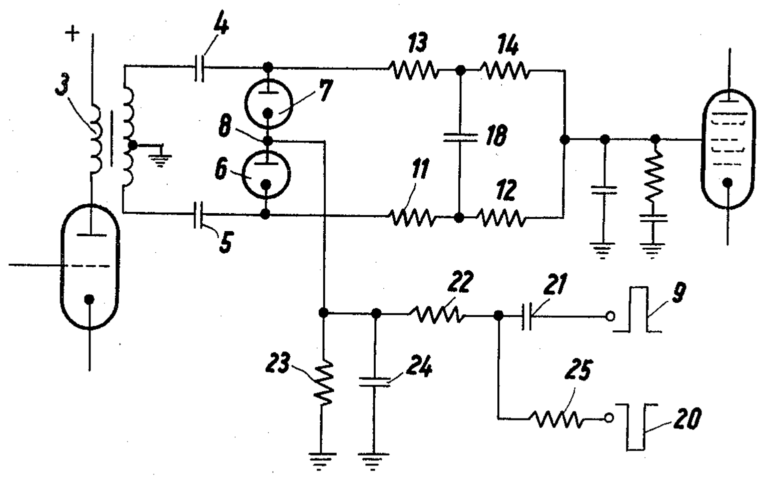
FIGURE 4 is a circuit diagram of a first embodiment of the invention using a known type of phase comparison circuit.

FIGURE 4 shows the change which is to be made in the circuit of FIGURE 1 and in which parts similar to those in FIGURE 1 have like reference numerals.

In this embodiment the amplitudes of the two half pulses of the same comparison pulse are made different.

In FIGURE 4, a positive flyback pulse 9 which approximates a rectangular shape and which is derived from the line deflection circuit, is fed to a differentiating member including a condenser 21, as well as two resistors 22 and 23, whereby the resistor 23 is connected in parallel to the condenser 24. According to the invention, a negatively directed pulse 20 of about the same duration is applied to the pulse thus differentiated. Preferably, this negative pulse is also derived from the line deflection circuit and is fed to the connection point of the condenser 21 and the resistor 22 via a resistor 25. Thus, a comparison or reference pulse as shown in FIGURE 3*c* appears at connection point 8 of the diodes 6 and 7.

Figure 5:
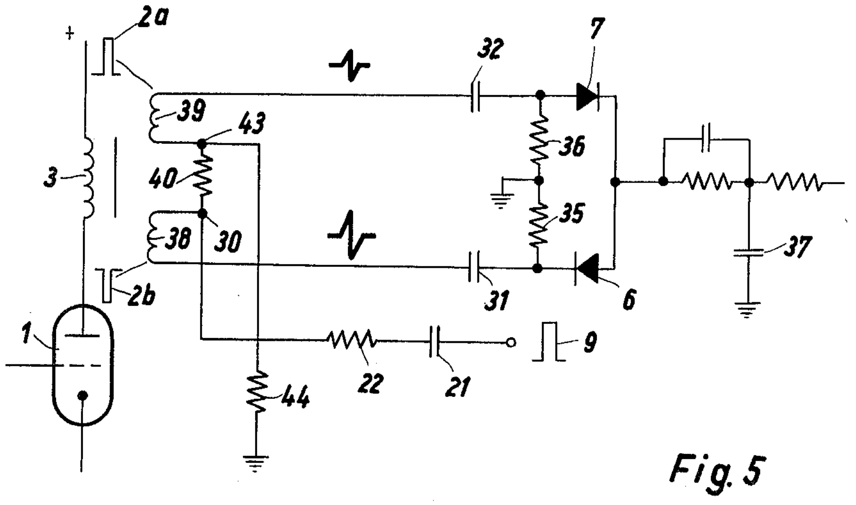
FIGURE 5 is a circuit diagram of another embodiment of the invention using a novel phase comparison circuit.
Figure 6:
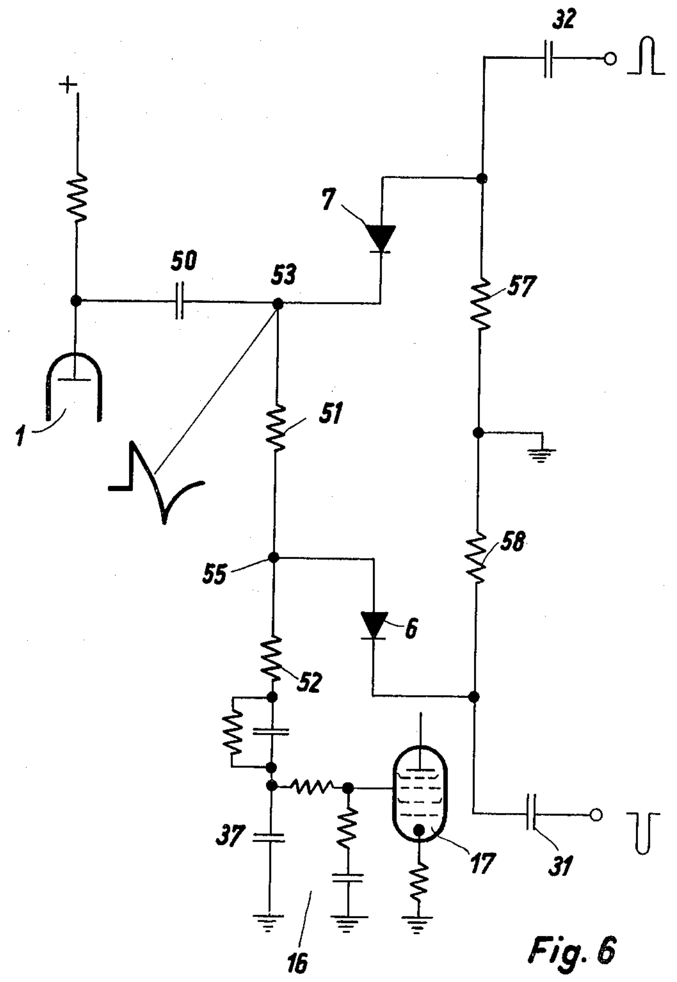
FIGURE 6 is a circuit diagram of a further embodiment which also uses a novel phase comparison circuit.

Further embodiments of the invention are illustrated in FIGURES 5 and 6 wherein the amplitudes of two comparison pulses of opposite phase are made different in both half pulses, of which, however, only one half pulse, respectively, controls the corresponding rectifier. In FIGURE 5, the differentiated comparison pulse is fed to the mid-tap 30 of the transformer 3. The phase comparison circuit is constructed differently from that of FIGURE 1 in that the pulses 2*a* and 2*b* are fed to the cathode of a diode 6 and to the anode of a diode 7 via condensers 31 and 32, respectively, which are connected to ground via resistors 35 and 36. The electrodes of the diodes 6 and 7, respectively, which are opposite or faced away from the condensers 31 and 32, respectively, are connected with the reactance tube via the filter illustrated on the right-hand side of the circuit. In this circuit, the condensers 31 and 32 are sufficiently large as to take over the function of the condenser 18 in FIGURE 1, in cooperation with the filter condenser 37, so that this additional storage condenser 18 may be omitted. The charges at the condensers 31 and 32 block the diodes 6 and 7, so that rapid discharging of the filter condenser 37 via the diodes is prevented.

The different amplitudes of the comparison pulse may be achieved, in this circuit, either by means of a circuit as illustrated in FIGURE 4, or, as will be explained in detail below with reference to FIGURE 5, by feeding different large comparison pulses to the two branches of the phase comparison circuit. For this purpose, the inner ends of the windings 38 and 39 are connected together via a resistor 40. The pulse 9 is fed to end 30 of the winding 38 via a condenser 21 and a resistor 22. The end 43 of the resistor 40 facing away from the point 30 is connected to ground via a resistor 44. In this manner, a differentiating member results which leaves the shape of the differentiated pulse unchanged with respect to the two branches 38 and 39, but which makes the amplitude different with respect to the two branches 38 and 39 that is small at the top, large at the bottom, without disturbing the symmetry of the phase comparison circuit with regard to the pulses 2*a* and 2*b*. The rectifiers are, at each instant, only controlled by one half pulse of the comparison pulses.

A similar embodiment of the invention is shown in FIGURE 6 in which the comparison pulses are produced by differentiating the synchronizing pulses separated from the video signal, while the locally produced pulses with opposite polarity are used unchanged. In this circuit, synchronizing pulses are taken from the anode of the last tube 1 of the separating stage and are differentiated by means of a differentiating section containing a condenser 50 as well as two resistors 51 and 52. The connection point 53 between the resistor 51 and the condenser 50 is connected with the cathode of a diode 7, while the connection point 55 between the resistors 51 and 52 is connected with the anode of a diode 6. The diodes 7 and 6 are connected together via resistors 57 and 58 and are fed positive and negative pulses, respectively, via condensers 32 and 31 to the anode and cathode. These pulses may be obtained, for example, at the line deflection transformer. The control voltage is applied to a filter 16 which is connected in series with the resistors 51 and 52 and, after being filtered, is applied to the reactance tube 17. In a preferred embodiment of the invention the condenser 18 has a value of 0.047 to 0.1 $\mu f$.

It will be understood that the above description of the present invention is susceptible to various modifications, changes, and adaptations, and the same are intended to be comprehended within the meaning and range of equivalents of the appended claims.

What is claimed is:

1. A circuit device for synchronizing an oscillator, comprising, in combination:

(a) a phase comparison circuit for producing a control voltage irrespective of whether there are variations in frequency and including at least two rectifiers;

(b) means connected to said phase comparison circuit for feeding synchronizing pulses to said rectifiers;

(c) means for feeding a series of locally produced single polarity pulses to said rectifiers;

(d) means connected between said feeding means and said phase comparison circuit for differentiating said series of pulses to form comparison pulses including two half pulses of opposite polarity which are asymmetrical with respect to one another, thereby controlling the rectifiers in the conducting direction;

(e) means for providing such a different amplitude that the curve of the control voltage produced by the phase comparison circuit in dependence on the frequency is zero symmetrical with respect to the control voltage provided when there is synchronism; and (f) means for superimposing an undifferentiated essentially single polarity pulse on the comparison pulse for providing the different amplitudes, said essentially single polarity pulse having a polarity which is equal to the polarity of the half pulse having a steeper comparison flank.

2. A circuit device for synchronizing an oscillator, comprising, in combination:

(a) a phase comparison circuit for producing a control voltage irrespective of whether there are variations in frequency and including at least two rectifiers;

(b) means connected to said phase comparison circuit for feeding synchronizing pulses to said rectifiers;

(c) means for feeding a series of locally produced single polarity pulses to said rectifiers;

(d) means connected between said feeding means and said phase comparison circuit for differentiating said series of pulses to form comparison pulses including two half pulses of opposite polarity and which have adjoining flank portions of different steepness, thereby controlling the rectifiers in the conducting direction; and (e) means for providing such a different amplitude that the curve of the control voltage produced by the phase comparison circuit in dependence on the fgrequency is zero symmetrical with respect to the control voltage provided when there is synchronism, said means for forming the different amplitudes including two portions of a secondary winding of a transformer in the phase comparison circuit, said portions are connected by a resistance, and said comparison pulses are fed to one side of said resistor, said circuit being arranged for feeding the larger amplitude to the rectifier which is controlled in the conductive direction by the steeper flank portion.

3. A circuit device for synchronizing an oscillator, comprising, in combination:

(a) a phase comparison circuit for producing a control voltage irrespective of whether there are variations in frequency and including at least two rectifiers;

(b) means connected to said phase comparison circuit for feeding synchronizing pulses to said rectifiers;

(c) means for feeding a series of locally produced single polarity pulses to said rectifiers;

(d) means connected between said feeding means and said phase comparison circuit for differentiating said series of pulses to form comparison pulses including two half pulses of opposite polarity which are asymmetrical with respect to one another, thereby controlling the rectifiers in the conducting direction; and (e) means for providing such a different amplitude that the curve of the control voltage produced by the phase comparison circuit in dependence on the frequency is zero symmetrical with respect to the control voltage provided when there is synchronism, said phase comparison circuit including a filter for the control voltage including a condenser, and coupling condeners via which the non-differentiated pulses are fed to said rectifiers in phase opposition, said coupling condensers being of such capacity that voltage surges which occur at non-synchronism are stored in the filter condenser for a time interval which is greater than the period of duration of the lowest frequency variation of the pulses to be compared which occur when pulling in, and said coupling condensers being connected in series with said filter condenser via said rectifiers.

References Cited by the Examiner

UNITED STATES PATENTS

| | | | |
|---|---|---|---|
| 2,979,661 | 4/1961 | Suhrmann | 328—110 |
| 3,012,201 | 12/1961 | Morphett | 328—134 |
| 3,144,612 | 8/1964 | Gassmann | 328—133 |

ARTHUR GAUSS, *Primary Examiner.*